United States Patent [19]

Inoue et al.

[11] 4,154,106

[45] May 15, 1979

[54] DISPOSABLE CLINICAL THERMOMETER

[75] Inventors: Fumiyoshi Inoue, Yamatokouriyama; Yukio Kikuchi; Yasunori Takiguchi, both of Toyonaka; Shinsuke Sonoi, Amagasaki, all of Japan

[73] Assignee: Morishita Jintan Company, Limited, Japan

[21] Appl. No.: 785,297

[22] Filed: Apr. 6, 1977

[30] Foreign Application Priority Data

Apr. 10, 1976 [JP] Japan .................................. 51/40542
May 11, 1976 [JP] Japan .................................. 51/53657
Dec. 28, 1976 [JP] Japan .................................. 51/159452

[51] Int. Cl.$^2$ .......................................... G01K 11/08
[52] U.S. Cl. ........................................ 73/356; 73/358; 116/207; 116/217
[58] Field of Search ............ 73/356, 358; 23/253 TP; 116/114.5, 114 V

[56] References Cited

U.S. PATENT DOCUMENTS

| | | | |
|---|---|---|---|
| 3,175,401 | 3/1965 | Geldmacher | 73/358 |
| 3,465,590 | 9/1969 | Kluth | 73/358 |
| 3,677,088 | 7/1972 | Lang | 73/356 |
| 3,835,990 | 9/1974 | Sagi et al. | 73/356 X |
| 3,895,523 | 7/1975 | Nollen | 73/356 |
| 3,929,021 | 12/1975 | Pecorella | 73/358 |
| 3,946,612 | 3/1976 | Sagi et al. | 73/356 |
| 3,981,683 | 9/1976 | Larsson | 73/358 |

*Primary Examiner*—S. Clement Swisher
*Assistant Examiner*—Denis E. Corr
*Attorney, Agent, or Firm*—Robert E. Burns; Emmanuel J. Lobato; Bruce L. Adams

[57] ABSTRACT

There is provided a disposable temperature indicator utilizing a change in condition of organic compounds at their melting point for the indication of temperature.

The disposable temperature indicator is used as a disposable clinical thermometer which comprises a temperature-sensing portion having a temperature-indicating mixture composed of a solid solution of two organic compounds belonging to n-aliphatic hydrocarbons, nontoxic, odorless and having a narrow range of melting points particularly suitable for use in clinical thermometers or a temperature-indicating mixture containing an amount of color reagent as means for developing a change in color upon the change from the solid to liquid state of the temperature indicating mixture upon exposure to heat of a body to be temperature-registered; and a temperature-indicating portion formed of a porous thin plate with one surface or both surfaces thereof coated with one or both of a pair of compounds soluble in said temperature-indicating mixture, such resulting coating serving to produce a color compound by reaction with said temperature-indicating mixture.

16 Claims, 21 Drawing Figures

DISPOSABLE CLINICAL THERMOMETER

BRIEF SUMMARY OF THE INVENTION

One object of the invention is to provide a disposable clinical thermometer of accurate temperature-indicating properties, nontoxic, odorless and safe in use by adults as well as by infants.

Another object of the invention is to provide a disposable clinical thermometer which is capable of ensuring a faultless and very easy read-out of temperatures by the combination of a change in physical condition or state of temperature-sensitive material composed of a mixture of organic compounds and the reaction of a color reagent.

Still another object of the invention is to provide a disposable clinical thermometer requiring not much time for temperature registration.

Other objects, characteristics and effects of the invention will be apparent from the following description.

The present invention relates to a temperature indicator utilizing a change in condition of organic compounds at their melting point. While clinical thermometers of the mercury-expansion type have been generally used very long for taking body temperature and other temperature measurements, they are easily breakable and have such inconveniences as requiring careful packing, transfer and preservation because of the use of costly mercury; the difficulty in reading out, sterilizing treatment before taking body temperature and a comparatively long period of time required for the registering of body temperature.

As substitutes for the mercury thermometer, there are various types of thermometer, for example, utilizing bimetals and liquid crystals, but their precision and accuracy are limited. There are also thermometers utilizing electronics and light, but they require special handling in use and are expensive so that they cannot find access to the field of universal use. All such thermometers are of the type for repeated uses.

On the other hand, disposable clinical thermometers utilizing melting points of organic compounds have been proposed recently.

Such thermometers substantially consist of a temperature-sensing portion and a temperature-indicating portion.

The temperature-sensing portion is filled with a temperature-sensitive material composed of one or more compounds so that when there occurs a change in condition from solid to liquid state of the temperature-sensitive material at a predetermined temperature upon absorbing heat from the body to be temperature-registered, the temperature-indicating portion can indicate the change in condition so as to be visible. After use, the thermometer is discarded as is usual with disposable thermometers.

Accordingly, their commercial merits, their function, easy handling and good preservation may, to a large extent, depend on the properties of the temperature-sensitive material and the function of the temperature-indicating portion.

In the present specification, the terminology "temperature-sensitive material" should be noted to mean materials capable of showing some change in condition or state upon absorbing heat and it is used in a broad sense to include temperature-indicating mixtures (uniform mixtures composed of more than two compounds and producing a change in condition at a given temperature upon absorbing heat).

In the case of utilizing the melting point of organic compounds for purposes of temperature indication, there are some methods of combining various kinds of refined organic compounds of different melting points within the required range of temperatures, or some methods of combining a number of mixtures of different melting points obtained by mixing two kinds of organic compound in suitable ratio within the required range of temperatures. The former methods harbors many disadvantages in point of manufacture, and the latter methods are considered more common.

As a matter of fact, the melting point of any temperature-sensitive material of the kind is usually elevated from the commencement of its melting to the termination of its perfect melting, no matter how carefully it has been previously prepared.

Under the circumstances, no effective temperature-sensitive material has yet been discovered, which can ensure the range of melting points within less than 0.1° C. and is chemically stable, nontoxic, odorless easy to handle in manufacture, and has no corrosive effect on appliances.

On the other hand, a temperature-indicating portion should be effective enough to indicate a change in condition of a temperature-sensitive material in the most rapid, exact and accurate manner.

With reference to the accompanying drawings, FIGS. 1 and 2 show one of the disposable thermometers which have been introduced hitherto.

It has a temperature-indicating portion which consists of a color layer 101 made of porous paper containing a color material and an indicating layer 102 in the form of porous paper having a color of contrast with said color layer Adjacent to the temperature-indicating portion is provided a temperature-sensitive material 103. In this case, the temperature-sensing portion and temperature-indicating portion are shut off from the external environment such as the open air by means of recesses 104 formed in a thin plate of good thermal conductivity and a transparent layer 105 made of a transparent plastic film.

When the disposable clinical thermometer is placed in the mouth or to be temperature-registered, the temperature-sensitive material becomes liquefied upon absorbing heat and is absorbed by the color layer where the color material is melted and then the color material thus melted is permeated into the temperature-indicating layer whereby the temperature can be indicated.

Since this kind of thermometer is restricted in size as hereinafter described, there is a drawback that the temperature-indicating layer has to be very thin, and accordingly the lower color layer becomes visible through the temperature-indicating layer so that the indicated temperature becomes difficult to read. In addition, as hereinbefore described, the temperature-sensitive material has a range of melting points, more or less, so that it cannot always reflect the temperature of the body to be temperature-registered, as another drawback.

With a view to eliminating such drawbacks, the following disposable thermometer is considered.

Namely, in said temperature-indicating or temperature visualizing portion, a porous material as a further absorbing layer is interposed between the color layer and the temperature-indicating or visualizing layer so that said absorbing layer can absorb part of the temperature-sensitive material having already melted at a temperature lower than a predetermined temperature to prevent the temperature-sensitive material from permeating into the temperature-indicating layer as the outermost layer. When the temperature-sensitive material has reached the body temperature, part thereof not then contained in the absorbing layer will permeate into the temperature-indicating or visualizing layer for the first time, thus indicating the exact body temperature. However, in view of the need of placing the thermometer in the mouth or body for purposes of temperature registration, there are certain restrictions in size of the temperature-registering portion of the thermometer. Usually the size of the temperature-sensing portion and the temperature-indicating portion is considered suitable such as 1.0 mm in diameter and several hundred microns in thickness.

Accordingly, the preparation of an absorbing layer that is accurate in function is extremely difficult from a technical point of view.

With reference to the accompanying drawings, FIG. 1 is a partial plane view showing only the temperature-registering portion of a conventional disposable clinical thermometer.

DETAILED DESCRIPTION OF THE INVENTION

With the view of introducing a new disposable clinical thermometer, the inventors of the present application first aimed at exploiting temperature-sensitive materials for use in thermometers and obtained about 100 kinds of combination (in pairs) of two different organic compounds having their melting points within the range of 20° C.–50° C., for example, from aliphatic hydrocarbons, aromatic compounds, alicyclic compounds, and nitrogen compounds, with consideration of various conditions of combination thereof.

On the basis of such combinations, the inventors have succeeded in discovering temperature-indicating mixtures for use in clinical thermometers by mixing such corresponding organic compounds in pairs in suitable mol ratios, heating and melting the mixtures to form solid solutions and carrying out thermal analysis of these temperature-indicating mixtures.

As organic compounds suitable for the manufacture of such temperature-indicating mixtures, there are n-heptadecane, n-docosane, n-octadecane, n-nonadecane, n-tetracosane, n-tricosane, and n-eicosane belonging to the normal saturated aliphatic hydrocarbons, n-pentadecanol, n-octadecanol, n-eicosanol, n-tetradecanol, n-dodecanol, n-hexadecanol, 1-pentadecanol, 1-tridecanol, 2,3-butanediol, and 1,6-hexanediol belonging to the aliphatic alcohols and myristic acid, palmitic acid, n-heptadecanoic acid, n-nonadecanoic acid and erucic acid belonging to the aliphatic acids.

Of the abovementioned compounds, certain temperature-indicating mixtures composed of combinations particularly suitable for use in thermometers are listed in Table 1, and those in pairs selected from the group of normal saturated aliphatic hydrocarbons are found to show ideal properties as temperature-indicating mixtures.

Table 1

| No. | A | B |
|---|---|---|
| 1 | n-octadecane | n-eicosane |
| 2 | n-eicosane | n-docosane |
| 3 | n-nonadecane | n-docosane |
| 4 | n-octadecane | n-docosane |
| 5 | n-nonadecane | n-tricosane |
| 6 | n-eicosane | n-tetracosane |
| 7 | 1-tridecanol | 1-pentadecanol |
| 8 | n-tetradecanol | n-hexadecanol |
| 9 | n-tetradecanol | n-pentadecanol |
| 10 | heptadecanoic acid | stearic acid |
| 11 | tridecanoic acid | myristic acid |

By mixing the compounds in column A and those of column B of Table 1, in suitable mol ratios, heating and melting them, it is possible to obtain temperature-sensitive mixtures having melting points at the required intervals within the required range of temperatures.

Needless to say, the compounds listed in columns A and B of Table 1 are required to have been refined with sufficient care.

If only one kind of temperature-indicating mixture fails to cover all of the required range of temperatures as a clinical thermometer, the required object can be attained by combining more than two kinds of such temperature-indicating mixtures.

Figure 1:
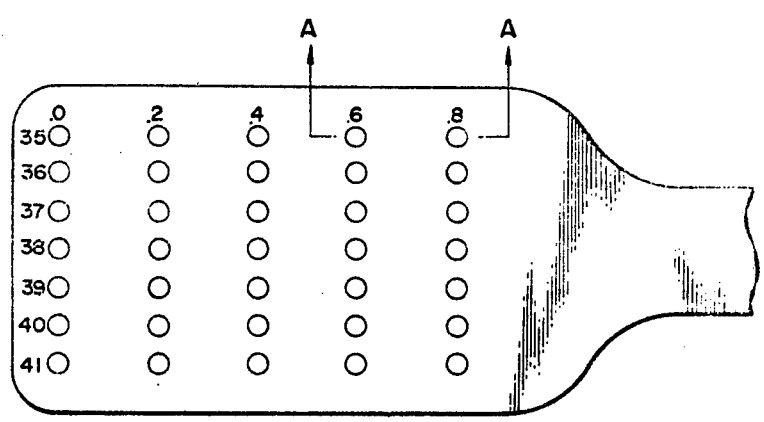
Figure 2:
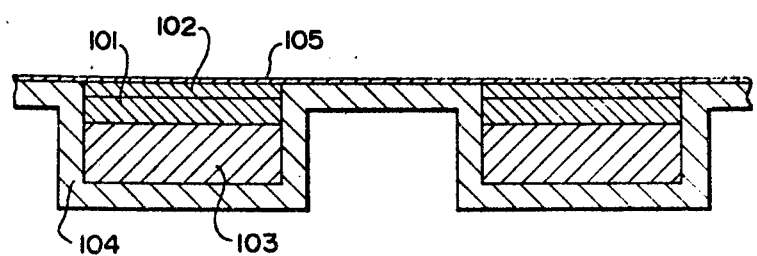
FIG. 2 is a partial cross-sectional view taken along A—A line of FIG. 1.
Figure 3:
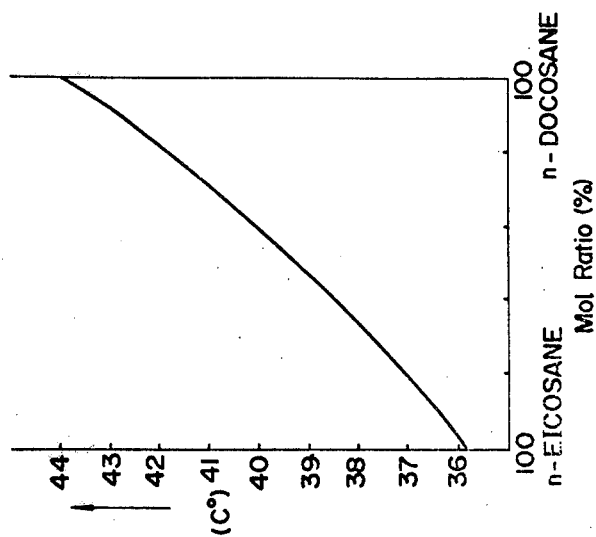
FIGS. 3 to 13 are views showing curves of melting point and composition of temperature-indicating mixtures according to the present invention.

In Table 1, the temperature-indicating mixture of n-octadecane and n-eicosane (No. 1) in combination is noted to show its melting point within the range of temperatures, about 27° C.–36° C., and as shown in FIG. 3, the curve of melting point and composition shows an extremely linear tendency which is considered ideal for a temperature-indicating mixture.

Also, as is apparent from FIG. 3, the range of melting point of each mixture can be obtained as less than 0.1° C.

Likewise, FIGS. 4–13 show curves of melting point and composition of temperature-indicating mixtures composed of combinations in No. 2–No. 11 of Table 1.

The temperature-sensitive mixture composed of n-eicosane and n-decosane of No. 2, Table 1 is noted to have a range of temperatures, about 36° C.–44° C., that of No. 3, Table 1 about 32° C.–44° C. and that of No. 4 about 27° C.–43.5° C. respectively so that their curves of melting point and composition within the range of these temperatures are noted to be almost linear.

With respect to the temperature-indicating mixtures of No. 2 to No. 11 of Table 1, the range of melting point of the mixtures can be obtained in the order of 0.1° C. similar to No. 1 of Table 1.

When the temperature-indicating mixtures of Table 1 are used in disposable clinical thermometers, for example, those of No. 1 and No. 2, it is possible to satisfy the range of 35° C.-42° C. suitable for a clinical thermometer.

Figure 4:
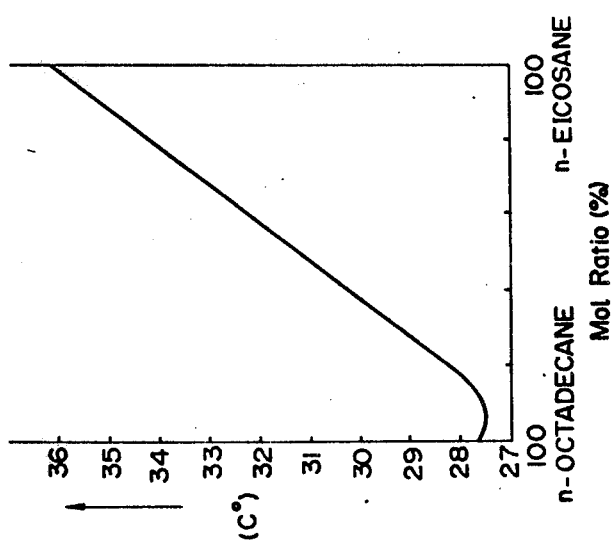
Figure 6:
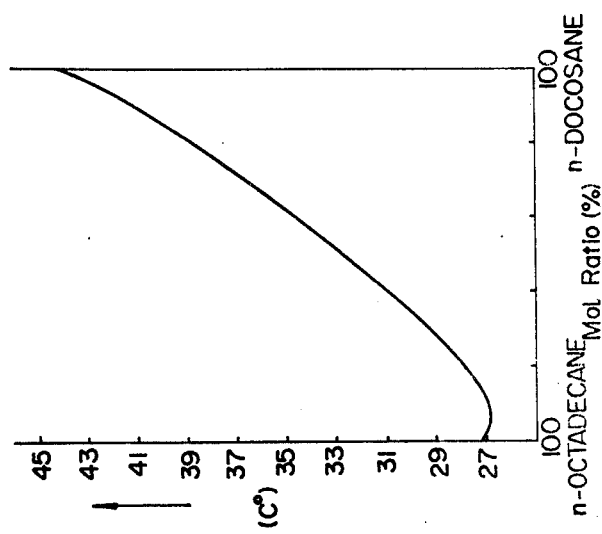
Figure 5:
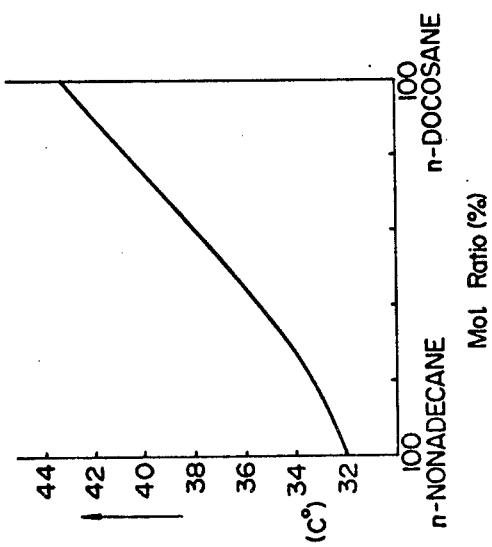
Figure 7:
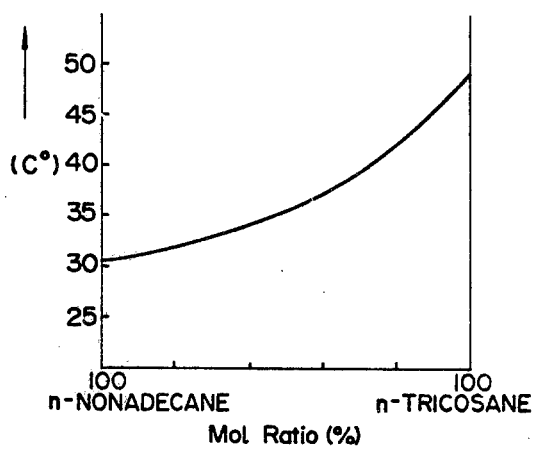
Figure 8:
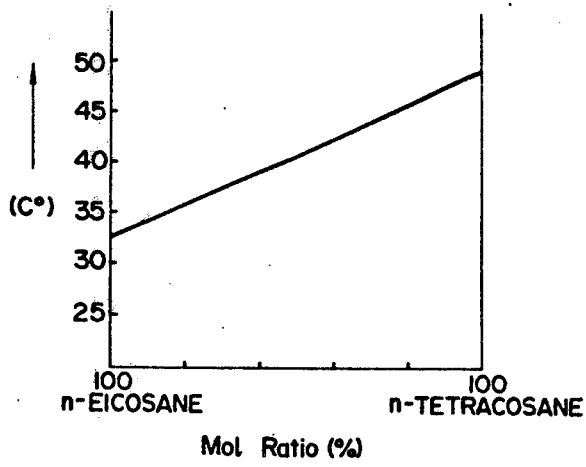
Figure 9:
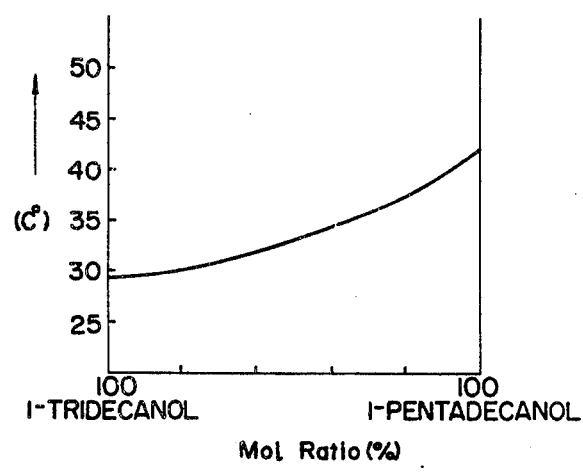
Figure 10:
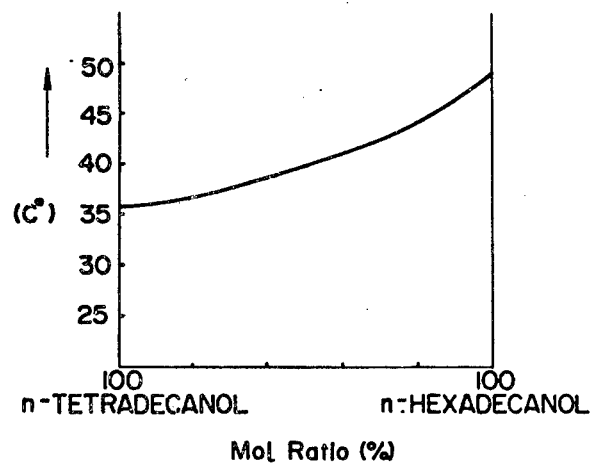
Figure 11:
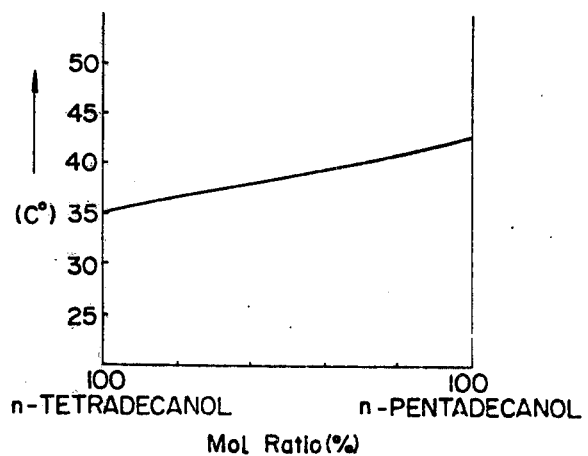
Figure 12:
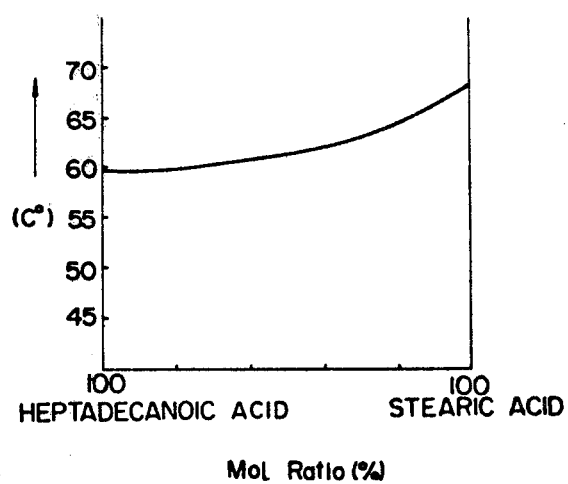
Figure 13:
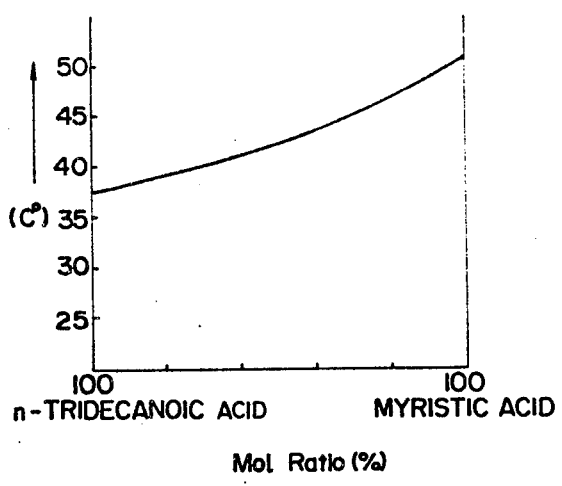

In order to obtain a temperature-indicating mixture having the required melting point, it is possible to select a composition corresponding to the desired melting point from FIG. 3 and 4.

With respect to the temperature-indicating mixtures of No. 1 and No. 2 of Table 1, Table 2 and 3 show melting points and compositions corresponding thereto.

Table 2

| No. | Melting Point °C. | Mol Ratio n-octa-decane | Mol Ratio n-eico-sane | No. | Melting Point °C. | n-octa-decane | n-eico-sane |
|---|---|---|---|---|---|---|---|
| 1 | 35.0 | 10.56 | 89.44 | 6 | 35.5 | 5.96 | 94.04 |
| 2 | 35.1 | 9.63 | 90.37 | 7 | 35.6 | 5.05 | 94.95 |
| 3 | 35.2 | 8.71 | 91.29 | 8 | 35.7 | 4.14 | 95.86 |
| 4 | 35.3 | 7.80 | 92.20 | 9 | 35.8 | 3.23 | 96.77 |
| 5 | 35.4 | 6.88 | 93.12 | 10 | 35.9 | 2.33 | 96.67 |

Table 3

| No. | Melting Point °C. | Mol Ratio n-eico-sane | Mol Ratio n-doco-sane | No. | Melting Point °C. | M./ Ratio n-eico-sane | M./ Ratio n-doco-sane |
|---|---|---|---|---|---|---|---|
| 1 | 36.0 | 99.32 | 0.68 | 31 | 39.0 | 57.69 | 42.31 |
| 2 | 36.1 | 97.69 | 2.31 | 32 | 39.1 | 56.41 | 43.59 |
| 3 | 36.2 | 96.21 | 3.79 | 33 | 39.2 | 55.13 | 44.87 |
| 4 | 36.3 | 94.74 | 5.26 | 34 | 39.3 | 53.86 | 46.14 |
| 5 | 36.4 | 93.27 | 6.73 | 35 | 39.4 | 52.59 | 47.41 |
| 6 | 36.5 | 91.82 | 8.18 | 36 | 39.5 | 51.33 | 48.67 |
| 7 | 36.6 | 90.37 | 9.63 | 37 | 39.6 | 50.07 | 49.93 |
| 8 | 36.7 | 88.93 | 11.07 | 38 | 39.7 | 48.82 | 51.18 |
| 9 | 36.8 | 87.49 | 12.51 | 39 | 39.8 | 47.57 | 52.43 |
| 10 | 36.9 | 86.07 | 13.93 | 40 | 39.9 | 46.33 | 53.67 |
| 11 | 37.0 | 84.65 | 15.35 | 41 | 40.0 | 45.09 | 54.91 |
| 12 | 37.1 | 83.24 | 16.76 | 42 | 40.1 | 43.86 | 56.14 |
| 13 | 37.2 | 81.83 | 18.17 | 43 | 40.2 | 42.63 | 57.37 |
| 14 | 37.3 | 80.44 | 19.56 | 44 | 40.3 | 41.41 | 58.59 |
| 15 | 37.4 | 79.05 | 20.95 | 45 | 40.4 | 40.19 | 59.81 |
| 16 | 37.5 | 77.67 | 22.33 | 46 | 40.5 | 38.98 | 61.02 |
| 17 | 37.6 | 76.29 | 23.71 | 47 | 40.6 | 37.77 | 62.23 |
| 18 | 37.7 | 74.92 | 25.08 | 48 | 40.7 | 36.56 | 63.44 |
| 19 | 37.8 | 73.56 | 26.44 | 49 | 40.8 | 35.36 | 64.64 |
| 20 | 37.9 | 72.21 | 27.79 | 50 | 40.9 | 34.17 | 65.83 |
| 21 | 38.0 | 70.85 | 29.15 | 51 | 41.0 | 32.98 | 67.02 |
| 22 | 38.1 | 69.51 | 30.49 | 52 | 41.1 | 31.79 | 68.21 |
| 23 | 38.2 | 68.17 | 31.83 | 53 | 41.2 | 30.61 | 69.39 |
| 24 | 38.3 | 66.84 | 33.16 | 64 | 41.3 | 29.43 | 70.57 |
| 25 | 38.4 | 65.52 | 34.48 | 55 | 41.4 | 28.26 | 71.74 |
| 26 | 38.5 | 64.20 | 35.80 | 56 | 41.5 | 27.09 | 72.91 |
| 27 | 38.6 | 62.89 | 37.11 | 57 | 41.6 | 25.92 | 74.08 |
| 28 | 38.7 | 61.58 | 38.42 | 58 | 41.7 | 24.76 | 75.24 |
| 29 | 38.8 | 60.28 | 39.72 | 59 | 41.8 | 23.60 | 76.40 |
| 30 | 38.9 | 58.98 | 41.02 | 60 | 41.9 | 21.30 | 78.70 |

With respect to the temperature-indicating mixtures listed in Table 1, what is worth particular mentioning is that the range of their melting points is narrow and, the accuracy and precision for use in thermometers, thus they can satisfy all requirements as temperature-sensitive materials for use in disposable clinical thermometers.

Namely, since all such mixtures belong to saturated hydrocarbons, they are naturally almost odorless and their toxicity amounts almost to nothing.

Moreover, since they are chemically stable, their handling and preservation is very convenient.

Following is a detailed description of a disposable clinical thermometer having a mechanism consisting of a temperature-sensing portion provided with said temperature-indicating mixture and upon a change in condition of said temperature-indicating mixture providing a color developing reaction in a temperature-indicating or visualizing portion.

Thus the disosable clinical thermometer of the present invention consists of a temperature-sensing portion, a temperature-indicating or visualizing portion and a stem portion.

Figure 14:
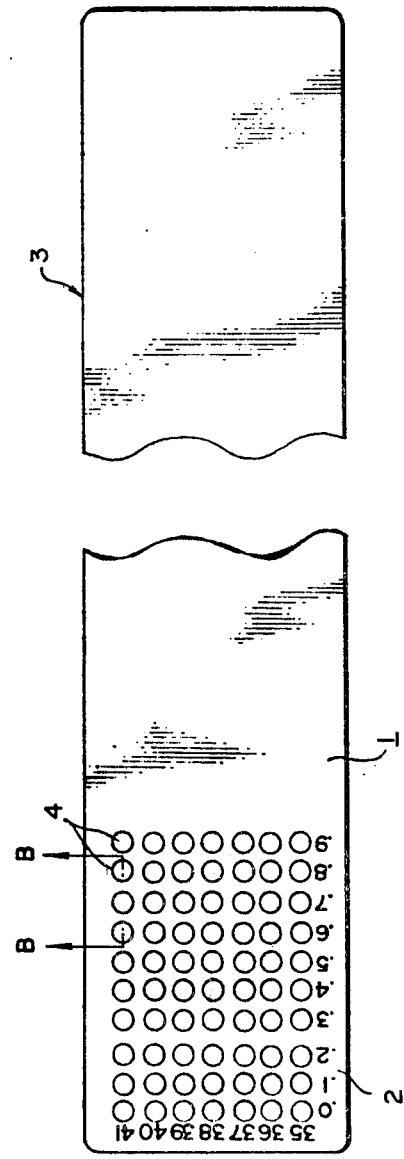
FIG. 14 is a plan view showing a condition of the disposable clinical thermometer just before its use for temperature registration.
Figure 15:
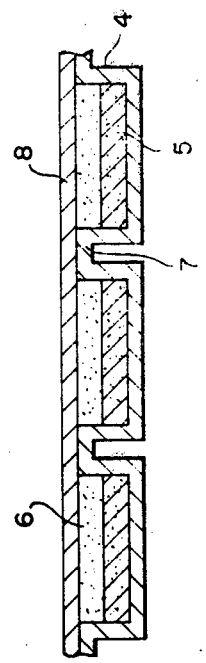
FIG. 15 is an enlarged sectional view taken along B—B line of FIG. 14.

In conjunction with a preferred embodiment of the present invention, the thermometer will be explained with reference to the accompanying drawings, wherein FIGS. 14 and 15 show the condition of the disposable clinical thermometer just before its application for temperature registration.

As hereinafter described, before use, the temperature-indicating or visualizing portion 6 is separated from the temperature-sensitive material 5 by some separating means during storage for its preservation.

The disposable clinical thermometer 1 comprises a thermo-conductive thin plate, for example, an aluminum foil of a thickness, about 100μ, which is formed with the required number of circular recesses of a depth, about 0.3 mm at equal pitches (In FIG. 14, the number of such recesses is 70). At the bottom of each circular recess 4 is provided a temperature-indicating mixture shown in Table 1, namely, n-octadecane and n-eicosane within the range of 35.0° C.-35.9° C. and n-eicosane and n-docosane corresponding to the range of 36.0-41.9° C. of FIG. 14 respectively. Mixtures corresponding to their melting points can be easily obtained from Tables 2 and 3.

On the other hand, the temperature-indicating or visualizing portion is formed of a porous material (for example, filter paper or the like), both surfaces of the porous material being coated with a pair of such compounds soluble in a temperature-sensitive material as to form a color developer.

Certain effective pairs of such reactive materials are listed in Table 4.

Table 4

| No. | Reactive material | Reactive material | Type of reaction | Color change |
|---|---|---|---|---|
| 1 | Dimethyl glyoxime | Nickel ion | Chelation | Blue-red |
| 2 | Curcumin | Boric acid | Transition | Yellow-Red |
| 3 | Crystal violet lactone | Acid clay | Oxidation | White-blue |
| 4 | Rhodamine lactone | Acid clay | Oxidation | White-red |

In Table 4, the compounds of No. 1–No. 4 can produce a color reaction rapidly, needless to say, in a melted solution of the temperature-sensitive materials of Table 1, to begin with, and certainly in such temperature-sensitive materials as have already been proposed, for example, o-chloronitrobenzene and o-bromonitrobenzene, L-methol and Dl-menthol, acetophenone and benzophenone, dimethylsuccinate and dimethyloxalate, 4-chloroprobiophenone and 4-bromopropiophenone, 4-chloro-2-methyl-aniline, 4-chloroacetophenone and 4-bromoacetophenone, n-butylsulphoxide and n-butylsulphone, n-hexane and 2-nonadecane, cyclohexane and 2-nonadecane, α-chrorocinnamaldehyde and α-bromocinnamaldehyde.

Of the 4 combinations shown in Table 4, particularly the combination (No. 3) of crystal violet lactone and acid clay and the combination (No. 4) of rhodamine lactone and acid clay are found most suitable for color developing purposes in view of the possibility of reading a color change against white color of the temperature-indicating portion.

As shown in FIG. 15, the temperature-indicating portion 6 can be brought into close adhesion to the temperature-sensitive material at the time of use by some means which will be exemplified later on, see FIGS. 17, 18, 19.

The circular recess portion 4 enclosing the temperature-sensitive material and the temperature-indicating portion can be covered with a transparent layer 8 in an air-tight manner.

As such transparent layer, for example, a transparent plastic film may be used.

When registering body temperature by the use of a disposable clinical thermometer of the above structure, the temperature-registering portion 2 supported by the stem portion 3 is placed in the mouth so that the temperature-sensitive material can melt upon exposure to body heat and the resulting melted liquid is absorbed by the temperature-indicating portion and then both reactive materials are dissolved, and dispersed in the melted solution thus causing the required reaction between them to develop a color.

Since thermometers of the kind are adapted to register temperature by irreversible means, the temperature-indicating or visualizing portion having once developed a color cannot be reused.

Accordingly, if the thermometer is manufactured as a commercialized product in such state of temperature-sensing portion and temperature-indicating portion as shown in FIG. 15, special care must be taken in handling and storage. In other words, it is necessary to maintain the environs around the thermometer in condition lower than the melting point of the temperature-sensitive material incorporated therein.

With a view to avoiding such inconvenience, it is proposed that the temperature-sensing portion and temperature-indicating or visualizing portion be kept separated from each other before use of the thermometer and when it is to be used, the temperature-sensing portion and temperature-indicating or visualizing portion may be brought into contact with each other.

Figure 16:
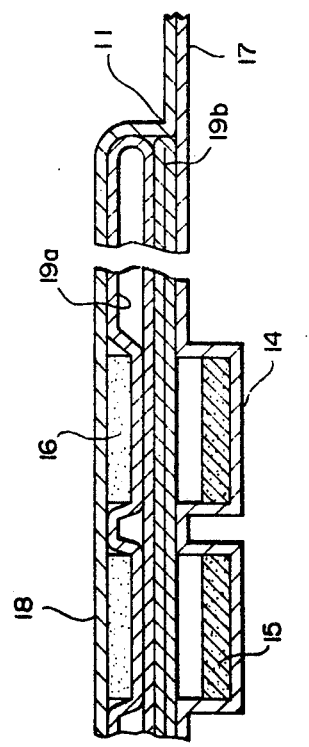
FIG. 16 is a partially enlarged sectional view of the disposable clinical thermometer of the present invention.
Figure 17:
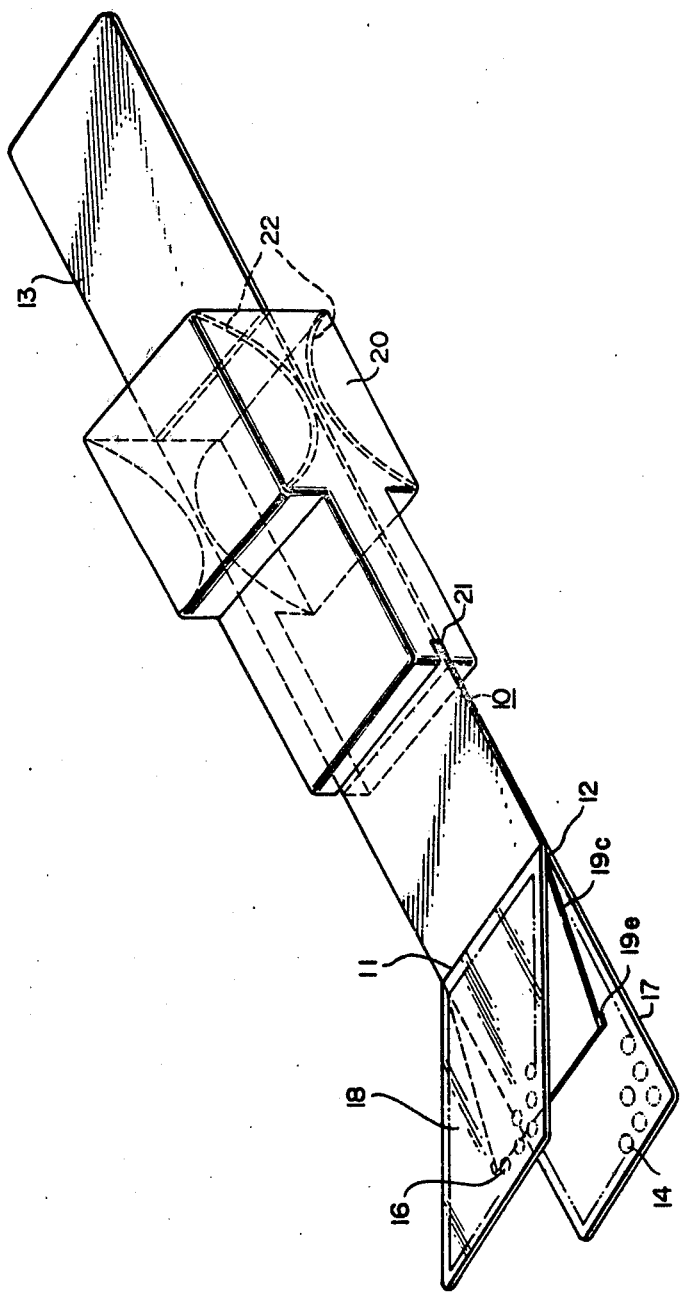
FIG. 17 is a perspective view showing an embodiment with a separating slider attached to a disposable clinical thermometer according to the present invention.

FIG. 16 and 17 show an example of the above-proposed idea. Namely, the disposable clinical thermometer consists of a stem portion 13 and a temperature-registering portion 12. The temperature-registering portion 12 consists of a portion having a temperature-indicating or visualizing portion 16 air-tightly held between a transparent layer 18 and a separating sheet 19a and a portion comprising an aluminum foil 17 formed with circular recesses 14, in each of which a temperature-sensitive material 15 is filled, said portion being air-tightly covered by a separating sheet 19b. In this case, the transparent layer 18 and the aluminum foil 17 are adapted to converge at the end 11 of the temperature-registering portion so as to form the stem portion 13, and the two separating sheets 19a and 19b are likewise adapted to converge together so as to form a sheet-withdrawing portion 19c.

The separating sheets 19a and 19b are closely adhered on the transparent layer 18 and the aluminum foil 17 by means of an adhesive in such a manner that they can be separated from each other, and in order to shut off the temperature-sensitive material 15 and the temperature-indicating or visualizing portion 16 from outer air, said separating sheets are folded back in the opposite direction at the end of the temperature-registering portion so that said two separating sheets may merge into a single body holding a rigid piece 19e projecting from the edge of the temperature-registering portion.

By pulling the rigid piece 19e in the direction opposite to the end of the temperature-registering portion, the separating sheets 19a and 19b are stripped from the transparent layer and the aluminum foil respectively. Subsequently, the transparent layer and aluminum foil are pressurized and as they are closely adhered with an adhesive, the temperature-sensitive material 15 and temperature-indicating portion are combined together and placed in close contact. Then the temperature-sensing portion and temperature-indicating or visualizing portion are exactly arranged in the corresponding positions on the transparent layer and aluminum foil respectively so that they can be air-tightly demarcated in the recess portion 14 by means of the transparent layer.

With respect to the separating sheets 19a and 19b, a withdrawl portion 19c may be pulled and removed by hand after which the aluminum foil and transparent layer will be placed in pressure contact but this procedure cannot be considered satisfactory because the combination of the temperature-sensing portion and temperature-indicating portion is liable to become imperfect and inconvenient.

Figure 18:
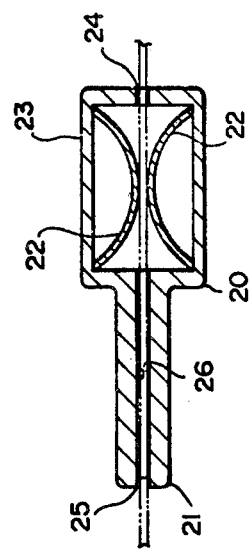
FIG. 18 is a sectional view of the separating slider.

In order to solve this problem, the separating slider 20 has been devised as shown in FIG. 18.

Namely, a casing 23 is formed with an inlet slit 25 and an outlet slit 24 for a separating slider 20 so that the disposable clinical thermometer 10 can pass through said slits from the stem portion 13 to the temperature-registering portion 12.

In the casing 23 are provided two pressure bodies, each made of a plate-shape resilient material in arcuate form in a confronting manner.

Moreover, the casing 23 has a guide surface 26 for conducting the direction of the thermometer between the outlet slit 24 and the pressure bodies 22. The length of the outlet slit 24 and the outlet slit 25 is made almost equal to the width of the temperature-registering portion 12. The end portion of the inlet slit 25 is cut away in part to form an engaging portion 21 for the rigid piece 19e. When the stem portion 13 is inserted into the inlet slit 25 of the separating slider and withdrawn from the outlet slit 24, the slider 20 will advance along the lengthwise direction of the thermometer so that the engaging portion can push the rigid piece 19e projected a little from the edge of the temperature-registering portion until the separating sheets 19a and 19b have been stripped off. After removal of the separating sheets 19a and 19b, the temperature-registering portion may be pressed lightly by the guide surface 26 and enter between the pressure bodies 22. At this point, the temperature-indicating portion and the temperature-sensing portion are almost combined in a confronting manner, when the transparent layer and the aluminum foil are exactly kept in pressure contact so that the temperature-registering portion can come out from the outlet slit while the temperature-sensitive material and the temperature-indicating portion are perfectly sealed from outer air.

Figure 19:
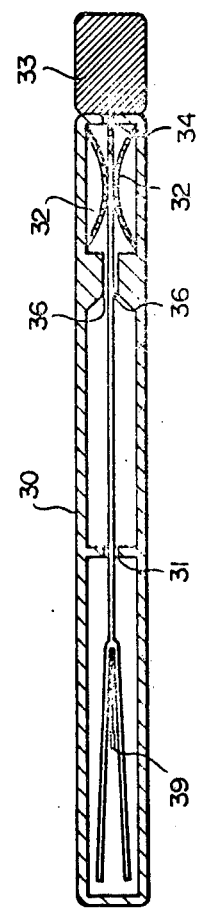
FIG. 19 is a sectional view showing another embodiment of the present invention.

The slider 20 may be manufactured separately from the clinical thermometer but, as shown in FIG. 19, it is also possible to form a slider in a body with a casing 30 for air-tightly protecting the temperature-registering portion of the thermometer from the surrounding environs.

The stem portion 33 and the casing 30 may be temporarily combined but can be so formed as they can be easily separated from each other by force. While withdrawing the disposable clinical thermometer from the casing 30 by pulling the stem portion 33, a rigid piece 39 comes in engagement with an engaging portion 31 so that the separating sheets can be removed, and subsequently, the thermometer is lightly pressed by a guide surface 36 and then in perfectly pressed and adhered condition may come out from an outlet slit 34, the seprating sheets being allowed to remain in the casing 30.

The characteristics and advantages of the disposable clinical thermometer thus disclosed will be enumerated hereinbelow.

(a) Since the temperature-indicating mixtures shown in Table 1 are chemically stable and the range of their melting points is narrow, the accuracy of the disposable clinical thermometer using such mixtures must be very promising, as compared with conventional thermometers.

(b) Since the temperature-indicating mixtures shown in Table 1 are composed of natural fats and oils or similar compounds, their toxicity and odor are minimal and therefore, they are most suitable for use in disposable clinical thermometers for orally registering body temperature.

(c) The conventional method of indicating body temperature consists in permitting a temperature-sensitive material to transfer to a portion of indicating a color of contrast with a color layer while dissolving a color developing material in the color layer in said temperature-sensitive material.

According to such conventional method, the activity of the temperature-sensitive material for dissolving a color material is only too large, and such a comparatively large amount of the temperature-sensitive material is required as is sufficient to dissolve the color material satisfactorily which enhances the necessity of an absorbing layer beng provided in order to prevent the permeation of the temperature-sensitive material into a temperature-indicating portion, in view of the tendency of its melting at a temperature lower than a predetermined indicating temperature.

As quite distinct from such conventional thermometer, according to the present invention, the temperature-indicating mechanism of the disposable clinical thermometer is characterized by the application of a reaction of coloration and only a small amount of temperature-sensitive material for use is sufficient to dissolve a pair of color developing reagents described in Table 2, and such pair of color developing reagents is applied to both surfaces of an extremely thin porous material so that a single porous material can serve concurrently as a color layer, absorbing layer and temperature-indicating layer and thus all the entity of the temperature-indicating portion may be thin enough, thus providing excellent properties superior to conventional thermometers in all points of temperature-indicating speed, thermal conductivity and manufacturing cost.

(d) Since the disposable clinical thermometer is generally used for oral registration of body temperature, its temperature-registering portion is limited in size of itself and therefore, the diameter of the temperature-sensing portion and temperature-indicating portion should be most desirably 1 mm and its depth, about 0.3 mm as a satisfactory commercial product.

Since such a small space should enclose the temperature-sensitive material, color layer and temperature-indicating portion, the temperature-indicating layer itself cannot but be very thin, through which the color layer becomes visible so that when body temperature is registered, it has heretofore been difficult to discriminate a color-developed portion from other portion.

In contrast, according to the present disposable clinical thermometer using the reaction systems of No. 3 and No. 4 shown in Table 2, the temperature-indicating or visualizing portion lacks such drawbacks as mentioned above so that even weak-sighted aged people can read temperature registration very easily.

The disposable clinical thermometer hereinbefore described must be epoch-making as it is, in that its temperature-indicating system uses a color-developing reaction.

However, even in this case, it cannot be avoided that the step of coating both surfaces of a porous thin material with a pair of color developing reagents must be complicated, it will be some long time before the color-reacted material is dissolved and dispersed in the temperature-sensitive material and the solubility of the color reagent itself in the temperature-sensitive material is found insufficient, and therefore, a comparatively large amount of temperature-sensitive material is required for use, thus all such drawbacks remaining still unimproved. A disposable clinical thermometer overcoming such drawbacks will be explained hereinafter.

The disposable clinical thermometer thus improved is provided as a thermometer consisting of a temperature-sensing portion containing a temperature-sensitive material composed of a temperature-indicating mixture of two organic compounds shown in Table 1, incorporated with a predetermined amount of a color developing reagents as a color-developing constituent and a temperature-indicating portion having a porous material containing a color developing agent to produce a color reaction with said color developing reagent or being coated with said color developing agent.

In achieving improvements in the disposable clinical thermometer, the inventors hit upon the plan of previously permitting one of a pair of compounds to produce a color compound by mutal reaction to be retained as a color developing constituent in the temperature-indicating mixture shown in Table 1 and searched pairs of color developing reagents befitting said compounds.

Such color developing constituents and color developing agents to produce a color by mutual reaction are naturally required to possess the following properties.

Namely, the requirements for a color developing constituent in the novel temperature-sensitive materials are that it can be dissolved in the group of temperature-sensitive materials listed in Table 1; it can give, by color developing reaction, an apparent color change to the temperature-indicating portion of the thermometer; and when a sufficient amount of such color developing constituent is retained in the temperature-sensitive material, it does not lead to a large change of the curve of melting point and composition of Table 1; and it is chemically stable so as to be preserved over long periods of time; and it has no marked toxicity.

As a result of pursuance of such color developing constituents, the inventors have been able to obtain the color developing reagents of No. 1–No. 6 as shown in Table 5.

Table 5

| No. | Color developing constituent | Color developing agent | Change in color |
|---|---|---|---|
| 1 | 3-dimethylamino-6,8-dimethyl-fluoran | Acid clay | White to red orange |
| 2 | Methyl red | Acid clay | Yellow to orange |
| 3 | Pentamethoxy red | Acid clay | Yellow to orange |
| 4 | Aminoazobenzene | Acid clay | Yellow to orange |
| 5 | Dimethyl yellow | Acid clay | Yellow to orange |
| 6 | Naphthyl red | Acid clay | Yellow to orange |

A temperature-sensitive material containing said color developing constituent can be obtained by mixing the temperature-indicating mixtures shown in Table 1 in No. 1 through No. 11 and one of the color developing constituents of No. 1 to No. 6 of Table 5 by selection, uniformly dispersing the resulting mixture by heating and dissolving.

Needless to say, the compounds in use are required to have been refined with sufficient care in a manner similar to the procedure already mentioned before.

As hereinbefore, described, the diameter of the temperature-indicating portion is about 1 mm as most suitable and therefore, in order to discriminate a change of coloration by observation with the naked eye, it is necessary for the temperature-indicating mixtures of Table 1 to contain one of the color developing constituents of Table 5 in an amount of at least as a minimum, of 0.01% by weight of said temperature-indicating mixtures of Table 1. Yet, in view of difference in eyesight of users of the disposable clinical thermometer, at least more than 0.1% by weight is desirable. However, if a color developing reagent in excess of 0.1% is retained in the temperature-indicating mixture, its effect on the temperature-indicating portion, namely, the concentration of coloration, speed of coloration and accuracy of temperature indication is not appreciably different from cases of 0.1% content, but its influence on the melting point of the temperature-indicating mixture will become larger. There is some difference in solubility of the color developing reagents of Table 2 in the compounds of columns A and B of Table 1. But there occurs no significant problem in permitting a concentration of 0.1–0.15% of such color developing reagent to be retained in the temperature-indicating mixtures of Table 1. At the same time, with respect to the influence of color developing constituents of Table 2 on the melting points of mixtures obtained by mixing the compounds of column A and those of column B of Table 1 in suitable mol ratios and in cases of the aforesaid 0.1–0.15% content of said color developing constituents, the decrease of melting point by about 0.1° C. can be almost uniformly observed throughout all mixtures (mol ratios).

Figure 20:
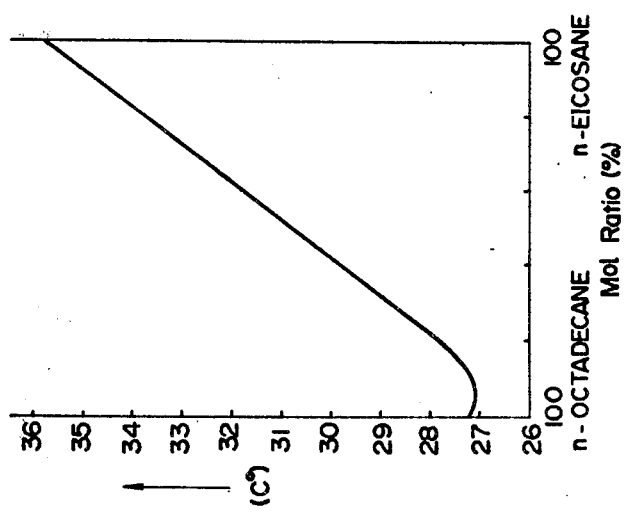

As a concrete example, n-octadedane and n-eicosane of Table 1 (No. 1, Table 1) are mixed in the required mol ratio, the resulting mixture being admixed with 0.1% by weight of dissolved 3-diethylamino-6,8-dimethylfluoran (No. 1, Table 5) to produce a temperature-sensitive material with a curve of melting point and composition as shown in FIG. 20. Likewise, n-eicosane and n-docosane (No. 2, Table 1) are melted and mixed in the required mol ratio, the resulting mixture being admixed with 0.1% by weight of dissolved 3-diethylamino-6,8-diethylfluoran to produce a temperature-sensitive material with a curve of melting point and composition as shown in FIG. 21.

Figure 21:
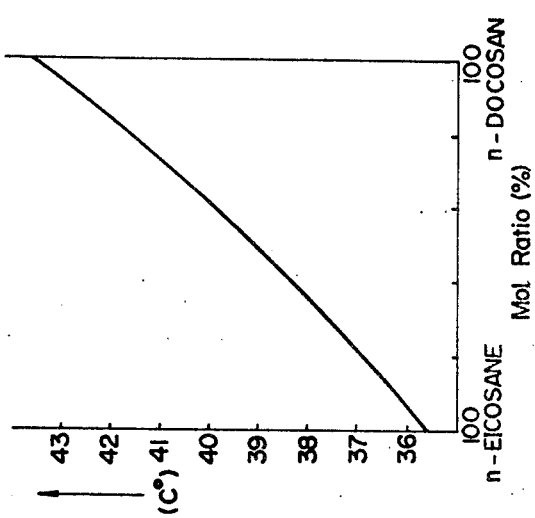
FIGS. 20 and 21 show curves of melting point and composition of a temperature-indicating mixture composed of two kinds of organic compound, said mixture being adapted to contain an amount of color reagent as a color developing constituent, according to the present invention.

In exemplifying the manufacture of a disposable clinical thermometer using the above-prepared temperature-sensitive materials, it is possible to determine the melting points and compositions of temperature-sensitive materials corresponding to said melting points as required for clinical thermometers from FIGS. 20 and 21 whereby a group of temperature-sensitive materials of different melting points can be easily obtained. The disposable clinical thermometer using said three constituents shows exactly the same physical structure as that of disposable clinical thermometers using the temperature-indicating mixtures composed of two constituents shown in FIGS. 14 through 19.

In this case, however, the only two different aspects are that the temperature-sensitive material is composed of three compounds including a color developing constituent and the temperature-indicating portion consists of a porous thin material such as filter paper impregnated with a color developing agent to develop a color upon reaction with said color developing constituent or a porous thin material having its one surface coated with said color developing agent.

The relationships of melting point and composition obtained from FIGS. 20 and 21 are shown in Tables 6 and 7 provided that a description about 3-diethylamino-6,8-dimethylfluoran as a color developing constituent is omitted because 0.1% by weight thereof is uniformly added to each mixture on the basis of weight of mixture composed of two other constituents.

When registering body temperature using a disposable clinical thermometer of the aforesaid structure, the temperature-registering portion supported by the stem portion is placed in the mouth or other orifice so that the temperature-sensitive material is sure to melt upon exposure to body temperature, the liquid thus melted is absorbed by the temperature-indicating portion to dissolve the acid clay applied to one surface of the temperature-indicating portion until the acid clay is made into ion thereby causing a coloration upon the required reaction between acid clay ion and the color developing reagent in the melted solution of temperature-sensitive material.

By reading out numerical values corresponding to the range of such colorations, it is possible to register body temperature.

Table 6

| No. | Melting Point °C. | Mol Ratio n-octadecane | Mol Ratio n-eicosane |
|---|---|---|---|
| 1 | 35.0 | 8.34 | 91.66 |
| 2 | 35.1 | 7.47 | 92.53 |
| 3 | 35.2 | 6.61 | 93.39 |
| 4 | 35.3 | 5.74 | 94.26 |
| 5 | 35.4 | 4.48 | 95.12 |
| 6 | 35.5 | 4.02 | 95.98 |
| 7 | 35.6 | 3.16 | 96.84 |
| 8 | 35.7 | 2.30 | 97.70 |
| 9 | 35.8 | 1.45 | 98.55 |
| 10 | 35.9 | 0.60 | 99.40 |

Table 7

| No. | Melting Point °C. | Mol Ratio n-eicosane | Mol Ratio n-docosane | No. | Melting Point °C. | Mol Ratio n-eicosane | Mol Ratio n-docosane |
|---|---|---|---|---|---|---|---|
| 1 | 36.0 | 97.89 | 2.11 | 31 | 39.0 | 53.81 | 46.19 |
| 2 | 36.1 | 96.21 | 3.79 | 32 | 39.1 | 52.52 | 47.48 |

Table 7-continued

| No. | Melting Point °C. | Mol Ratio n-eicosane | Mol Ratio n-docosane | No. | Melting Point °C. | Mol Ratio n-eicosane | Mol Ratio n-docosane |
|---|---|---|---|---|---|---|---|
| 3 | 36.2 | 94.54 | 5.46 | 33 | 39.2 | 51.23 | 48.77 |
| 4 | 36.3 | 92.89 | 7.11 | 34 | 39.3 | 49.96 | 50.04 |
| 5 | 36.4 | 91.26 | 8.74 | 35 | 39.4 | 48.70 | 51.30 |
| 6 | 36.5 | 89.64 | 10.36 | 36 | 39.5 | 47.44 | 52.56 |
| 7 | 36.6 | 88.05 | 11.95 | 37 | 39.6 | 46.19 | 53.81 |
| 8 | 36.7 | 86.47 | 13.53 | 38 | 39.7 | 44.95 | 55.05 |
| 9 | 36.8 | 84.90 | 15.10 | 39 | 39.8 | 43.72 | 56.28 |
| 10 | 36.9 | 83.35 | 16.65 | 40 | 39.9 | 42.50 | 57.50 |
| 11 | 37.0 | 81.82 | 18.18 | 41 | 40.0 | 41.28 | 58.72 |
| 12 | 37.1 | 80.30 | 19.70 | 42 | 40.1 | 40.07 | 59.93 |
| 13 | 37.2 | 78.80 | 21.20 | 43 | 40.2 | 38.87 | 61.13 |
| 14 | 37.3 | 77.31 | 22.69 | 44 | 40.3 | 47.67 | 62.33 |
| 15 | 37.4 | 75.83 | 24.17 | 45 | 40.4 | 36.48 | 63.52 |
| 16 | 37.5 | 74.37 | 25.63 | 46 | 40.5 | 35.30 | 64.70 |
| 17 | 37.6 | 72.92 | 27.08 | 47 | 40.6 | 34.13 | 65.87 |
| 18 | 37.7 | 71.48 | 28.52 | 48 | 40.7 | 32.96 | 67.04 |
| 19 | 37.8 | 70.06 | 29.94 | 49 | 40.8 | 31.80 | 68.20 |
| 20 | 37.9 | 68.65 | 31.35 | 50 | 40.9 | 30.65 | 69.35 |
| 21 | 38.0 | 67.24 | 32.76 | 51 | 41.0 | 29.50 | 70.50 |
| 22 | 38.1 | 65.85 | 34.15 | 52 | 41.1 | 28.36 | 71.65 |
| 23 | 38.2 | 64.47 | 35.53 | 53 | 41.2 | 27.22 | 72.78 |
| 24 | 38.3 | 63.11 | 36.89 | 54 | 41.3 | 26.09 | 73.91 |
| 25 | 38.4 | 61.75 | 38.25 | 55 | 41.4 | 24.97 | 75.03 |
| 26 | 38.5 | 60.40 | 39.60 | 56 | 41.5 | 23.85 | 76.15 |
| 27 | 38.6 | 59.06 | 40.94 | 57 | 41.6 | 22.74 | 77.26 |
| 28 | 38.7 | 57.73 | 42.27 | 58 | 41.7 | 21.63 | 78.37 |
| 29 | 38.8 | 56.42 | 43.58 | 59 | 41.8 | 20.53 | 79.47 |
| 30 | 38.9 | 55.11 | 44.89 | 60 | 41.9 | 19.43 | 80.57 |

The color developing reagents shown in Table 5 can be used as color developing constituents, needless to say, in the temperature-sensitive materials shown in Table 1, and likewise in other materials heretofore proposed as substitutes for those of Table 1, for example, o-chloronitro benzene, acetophenone and benzophenone, 4-bromopropiophenone and 4-chloropropiophenone, 4-bromoacetophenone and 4-chloroacetophenone and L-menthol and Dl-menthol.

Moreover, of the color developing reagents shown in Table 2, the combination of particularly 3-diethylamino-6,8-dimethylfluoran and acid clay produces a clear color change (white to red orange) so that it is regarded as most suitable for color-indicating purposes. The characteristics of the disposable clinical thermometer thus improved will be compared with those of a disposable clinical thermometer using a temperature-indicating mixture composed of the aforesaid two constituents hereinbelow.

(a) In order that the temperature-indicating mixture melted upon exposure to body temperature may dissolve the compounds of No. 1 to No. 4 of Table 4, a comparatively large amount of temperature-sensitive material is required and it will be some long time before said compounds are dispersed in the temperature-indicating mixture, so far as the latter thermometer is concerned.

In contrast, according to the improved thermometer, since a color developing constituent is previously and uniformly dispersed in the temperature-sensitive material, less is required for its dispersion and a smaller amount of temperature-sensitive material is sufficient and effective so that the sensitivity of the thermometer can be remarkably improved.

(b) Since the color developing reagents shown in Table 5 are dissolved and dispersed in the temperature-sensitive materials of Table 1, they are excluded from outer air, and have excellent chemical stability, leading to the smooth transfer of the temperature-sensitive material, namely, the smooth transfer of the color developing reagent to produce a rapid coloration and moreover, they are excellent in concentration and uniformity of coloration.

(c) Since one surface of an extremely thin porous material is coated with acid clay easily reactive with the color developing agents of Table 5, the improved thermometer is much easier to manufacture and by far more economical than other thermometers having both sides of a porous material coated with a color developing agent.

What is claimed is:

1. A disposable clinical thermometer capable of registering body temperatures comprising: a thermoconductive thin plate having a plurality of spaced recesses, each recess filled with a solid temperature sensitive material having a different predetermined melting temperature, the temperature sensitive material being a pair of normal saturated aliphatic compounds selected from the group consisting of n-octadecane, n-eiocosane, n-docosane, n-tetradecanol, n-nonadecane, n-tricosane, n-tetracosane, 1-tridecanol, n-pentadecanol, n-hexadecanol, 1-pentadecanol, heptadecanoic acid, stearic acid, tridecanoic acid and myristic acid, and temperature visualizing means capable of contacting said temperature sensitive material, when said thermometer is in use, containing a pair of color developing reagents which react to produce a change in color upon being dissolved in the temperature sensitive material melted during the registration of body temperature.

2. A disposable thermometer according to claim 1 wherein the temperature sensitive material is a pair of normal saturated aliphatic hydrocarbons selected from the group of pairs consisting of: n-octadecane and n-eicosane; n-eicosane and n-docosane; n-nonadecane and n-docosane; n-octadecane and n-docsane; n-nonadecane and n-tricosane and n-eicosane and n-tetracosane in varying ratios such that temperature differences of about 0.1° C. are indicated.

3. A disposable thermometer according to claim 1 wherein the temperature sensitive material is separated by a removable sheet from the temperature indicating means.

4. A disposable clinical thermometer according to claim 1 wherein the temperature visualizing means consists of a porous thin material coated with said pair of color developing reagents which dissolve in the melted temperature sensitive material and thus react and produce a color change in response to the body temperature registered.

5. A disposable thermometer according to claim 4 wherein said pair of color developing reagents comprises a color developing agent and a color developing constituent and the porous thin material is coated with a color developing agent and the temperature sensitive material is admixed with a color developing constituent.

6. A disposable thermometer according to claim 1 wherein the temperature sensitive material is admixed with one of the pair of the color developing reagents and the temperature indicating means carries the other of the pair of color developing reagents.

7. A disposable thermometer according to claim 6 wherein one of the pair of the color developing reagents is a color developing constituent and the other of the pair is a color developing agent.

8. A disposable thermometer according to claim 7 wherein the color developing constituent admixed in the temperature sensitive material is selected from the group consisting of 3-diethylamino-6,8-dimethylfluoran, methyl red, pentamethoxy red, aminoazobenzene, dimethyl yellow and naphthyl red and the color developing agent in the temperature indicating means is acid clay, each constituent and agent forming a pair of reagents.

9. A disposable thermometer according to claim 1 wherein the color developing reagents are pairs selected from the group consisting of dimethylglyoxime: nickel ion; curcumin: boric acid; crystal violet lactone: acid clay and rhodamine: acid clay.

10. A disposable clinical thermometer which comprises a temperature-sensing portion consisting of a good heat-conductive thin plate formed with more than one recess having a thermosensitive material filled therein, said thermosensitive material changing physical state from solid to liquid at a predetermined temperature and a temperature-visualizing portion provided in a position confronting said temperature-sensing portion and adapted to communicate with said temperature-sensing portion to make the change in physical state of said thermosensitive material visible, said thermosensitive material being composed of a pair of compounds in varying ratio selected from pairs of n-octadecane and n-eicosane, n-eicosane and n-docosane, n-nonadecane and n-docosane, n-octadecane and n-docosane, n-nonadecane and n-tricosane and n-eicosane and n-tetracosane and said pair of compounds serving as a temperature-indicating mixture to form a solid-and liquid body and also comprising a pair of color-developing reagents which dissolve in said thermosensitive material when said thermosensitive material is melted during the registration of body heat and react to produce a color change, one of said color developing reagents being contained in said temperature visualizing means and the other being dispersed in said thermosensitive material or both of said color developing reagents being contained in said temperature visualizing means.

11. A disposable clinical thermometer, as claimed in claim 10, wherein one reagent of said pair of color developing reagents is acid clay and the other reagent is selected from the group consisting of 3-diethylamino-6,8-dimethylfluoran, methyl red, pentamethoxy red, aminoazobenzene, dimethyl yellow and naphthyl red and wherein said temperature visualizing portion is constituted by a porous thin piece coated on one surface with said acid clay and a predetermined amount of said other reagent of said pair of color-developing reagents is dispersed in said temperature-sensing material.

12. A disposable clinical thermometer which comprises a temperature-sensing portion consisting of a good heat-conductive thin plate formed with more than one recess having a thermosensitive material filled therein, said thermosensitive material tending to show a change in physical state from solid to liquid at a predetermined and a temperature-visualizing portion provided in a position confronting said temperature-sensing portion and adapted to communicate with said temperature-sensing portion to make the change in physical state of said thermosensitive material visible, said temperature-visualizing portion being constituted by a porous thin piece having both surfaces coated with a pair of color-developing reagents respectively to be dissolved in said thermosensitive material so as to develop a color; said thermosensitive material being composed of a pair of compounds selected from pairs of n-octadecane and n-eicosane, n-eicosane and n-docosane, n-nonadecane and n-docosane, n-octadecane and n-docosane, n-nonadecane and n-tricosane and n-eicosane and n-tetracosane and said pair of compounds serving as a temperature-indicating mixture to form a meltable body.

13. A disposable clinical thermometer as claimed in claim 12 wherein one member of said pair of color developing reagents is acid clay and the other member is selected from the group consisting of 3-diethylamino-6,8-dimethylfluoran, methyl red, pentamethoxy red, aminoazobenzene, dimethyl yellow and naphthyl red.

14. A disposable clinical thermometer, as claimed in claim 12, wherein said pair of color-developing reagents is a pair of color-developing reagents selected from the group of pairs consisting of crystal violet lactone and acid clay, and rhodamine and acid clay.

15. A disposable clinical thermometer capable of registering body temperature comprising: a thermoconductive thin plate having a plurality of spaced recesses, each recess filled with a solid temperature sensitive material having a different predetermined melting temperature, the temperature sensitive material being a pair of saturated aliphatic alcohols in varying ratios selected from the group consisting of a n-tetradecanol, 1-tridecanol, n-pentadecanol, n-hexadecanol, 1-pentadecanol, and temperature visualizing means capable of contacting said temperature sensitive material, when said thermometer is in use, containing a pair of color developing reagents which produce a change in color upon being dissolved in the temperature sensitive material melted during the registration of body temperature.

16. A disposable clinical thermometer capable of registering body temperatures comprising: a thermoconductive thin plate having a plurality of spaced recesses, each recess filled with a solid temperature sensitive material having a different predetermined melting temperature, the temperature sensitive material being a pair of saturated aliphatic fatty acids in varying ratios selected from the group consisting of heptadecanoic acid, stearic acid, tridecanoic acid and myristic acid, and temperature visualizing means capable of contacting said temperature sensitive material, when said thermometer is in use, containing a pair of color developing reagents which produce a change in color upon being dissolved in the temperature sensitive material melted during the registration of body temperature.

* * * * *